(12) United States Patent
Nelson

(10) Patent No.: US 7,911,372 B2
(45) Date of Patent: Mar. 22, 2011

(54) ACTIVE IMAGING USING SATELLITE COMMUNICATION SYSTEM

(75) Inventor: Mark D. Nelson, Gilbert, AZ (US)

(73) Assignee: Kinetx, Inc., Tempe, AZ (US)

( * ) Notice: Subject to any disclaimer, the term of this patent is extended or adjusted under 35 U.S.C. 154(b) by 0 days.

(21) Appl. No.: 12/612,492

(22) Filed: Nov. 4, 2009

(65) Prior Publication Data

US 2010/0045512 A1    Feb. 25, 2010

Related U.S. Application Data

(63) Continuation of application No. 11/398,152, filed on Apr. 4, 2006, now Pat. No. 7,633,427.

(60) Provisional application No. 60/729,158, filed on Oct. 20, 2005.

(51) Int. Cl.
*G01S 13/00* (2006.01)

(52) U.S. Cl. .................. 342/25 R; 342/453; 342/179

(58) Field of Classification Search ............. 342/25
See application file for complete search history.

(56) References Cited

U.S. PATENT DOCUMENTS

| | | | |
|---|---|---|---|
| 5,563,606 A | 10/1996 | Wang | |
| 5,949,364 A * | 9/1999 | Katzberg et al. | 342/25 A |
| 6,340,947 B1 | 1/2002 | Chang et al. | |
| 6,388,606 B1 | 5/2002 | Keydel et al. | |
| 6,400,306 B1 * | 6/2002 | Nohara et al. | 342/25 R |
| 7,298,866 B2 | 11/2007 | Lee | |
| 7,633,427 B2 * | 12/2009 | Nelson | 342/25 R |
| 2002/0009059 A1 | 1/2002 | Abutaleb et al. | |
| 2002/0041328 A1 | 4/2002 | LeCompte et al. | |
| 2003/0072470 A1 | 4/2003 | Lee | |
| 2003/0122700 A1 * | 7/2003 | Moreira et al. | 342/25 |
| 2003/0122705 A1 * | 7/2003 | Marko et al. | 342/357.01 |
| 2003/0222820 A1 | 12/2003 | Karr et al. | |
| 2004/0113835 A1 * | 6/2004 | Jones et al. | 342/160 |
| 2005/0073455 A1 * | 4/2005 | Chow et al. | 342/25 F |
| 2005/0104763 A1 | 5/2005 | Hall et al. | |
| 2006/0033656 A1 * | 2/2006 | Budic | 342/195 |
| 2006/0164288 A1 * | 7/2006 | Voelker | 342/25 A |

OTHER PUBLICATIONS

Gerhard Krieger et al., "Multistatic SAR Satellite Formations: Potentials and Challenges", Microwaves and Radar Institute, German Aerospace Centre (DLR), 2005, pp. 2680-2684, IEEE, Germany.
Gerhard Krieger et al., "Potentials of Digital Beamforming in Bi- and Multistatic SAR", Microwaves and Radar Institute, German Aerospace Centre (DLR), 2003, pp. 527-529, IEEE, Germany.

(Continued)

*Primary Examiner* — Thomas H Tarcza
*Assistant Examiner* — Timothy A Brainard
(74) *Attorney, Agent, or Firm* — Rowan P. Smith; Quarles & Brady LLP

(57) ABSTRACT

An active imaging system uses communication satellites to identify the location and physical attributes of a target. A transmitter emits a time-synchronized signal directed to a target. The transmitter radiates L-band RF signals. The transmitter can be positioned on an airborne or ground platform. A constellation of communication satellites receives and time stamps the time-synchronized signal reflected from the target to form an active image of the target. The constellation of communication satellites have multiple roles other than active imaging, such as providing voice and data communications. The time-synchronized signal reflected from the target can be received by multiple satellites within the constellation of communication satellites or by multiple antenna disposed on one satellite within the constellation of communication satellites.

16 Claims, 3 Drawing Sheets

OTHER PUBLICATIONS

Kamal Sarabandi, et al., "GLORIA: Geostationary/Low-Earth Orbiting Radar Image Acquisition System: A Multi-Static GEO/LEO Synthetic Aperture Radar Satellite Constellation for Earth Observation", The University of Michigan, Radiation Lab, 2003, pp. 773-775, IEEE, USA.

M. Cherniakov et al., "Air Target Detection Via Bistatic Radar Based on LEOS Communication Signals", 2002, pp. 33-38, IEE Proc-Radar Sonar Navig., vol. 149, No. 1, US.

Supplementary European Search Report, EP 06 84 8805, Nov. 10, 2009, 7 pages.

* cited by examiner

ACTIVE IMAGING USING SATELLITE COMMUNICATION SYSTEM

CROSS-REFERENCE TO RELATED APPLICATION

This application is based on, claims the benefit of, and incorporates by reference U.S. Provisional Application Ser. No. 60/729,158 filed Oct. 20, 2005 by Mark D. Nelson entitled "ACTIVE IMAGING USING SATELLITE COMMUNICATION SYSTEM" and is a continuation of U.S. patent application Ser. No. 11/398,152 filed Apr. 4, 2006 now U.S. Pat. No. 7,633,427 by Mark D. Nelson and entitled "ACTIVE IMAGING USING SATELLITE COMMUNICATION SYSTEM".

FIELD OF THE INVENTION

The present invention relates in general to terrain mapping active imaging systems and, more particularly, to a system and method of using a satellite communication system to conduct active imaging for terrestrial mapping and object identification.

BACKGROUND OF THE INVENTION

Satellite imaging is an important tool used by governments and commercial entities to gather information about terrestrial-based activities and features. The information sought may pertain to activities such as terrain mapping, weather forecasting, scientific research, intelligence gathering, navigation, communications, agriculture, ecology, pollution monitoring, urban planning, water resources management, mineral exploration, and the like. In terrain mapping, the satellite takes real-time images of the Earth's surface, and objects located thereon, and can accurately represent the present state of the terrain as well as identify any changes, e.g., new structures and geological formations. For the intelligence gathering function, satellites are invaluable for monitoring areas of strategic importance and provide real-time feedback for military and political planning. Governments need to know activities associated with foreign installations and movement of people and equipment.

Satellites are generally known or classified as passive or active type systems. A passive satellite reflects or scatters incident radiation from one Earth station to another, i.e. radio signals are transmitted by reflection. A passive system is designed to look down from Earth orbit and receive incident radiation, or take a digital photograph, which is representative of an image of the terrain or specific objects located on the Earth's surface. Passive systems can provide good resolution images, but generally cannot see through cloud cover or other obstacles and are limited to operation only during daylight hours.

Active satellite systems use more advanced technologies than passive systems. An active satellite has transmitting equipment aboard, such as a transponder, power supplies, and signal processing equipment. The transponder receives a signal from Earth and retransmits the signal back to Earth. The transponder and signal processing equipment may perform operations such as amplification, filtering, regeneration, frequency translation, link switching, and other signal processing before re-transmission back to Earth. The re-transmission may occur immediately or after a short delay. Most active satellites have more than one transponder and antenna so that they can relay several radio waves or signals at the same time.

One area of interest for satellites is known as active imaging. Active imaging satellites are typically placed in geostationary, low earth orbit (LEO), e.g., about 400-1,000 km in altitude. The satellite paints the area of interest with high frequency radio signals, which are reflected back to the satellite. The returning radio waves are processed to produce a visual representation of the terrain or terrestrial-based object. Active imaging can also be used for mapping deep space and other LEO objects. Unlike the limitations of passive systems, active imaging can see through cloud cover and other obstructions and can operate day or night, in any weather condition. Moreover, active imaging can produce higher resolution images of the terrain or objects of interest, e.g., 1-4 meters in resolution.

In the present state of technology, most if not all satellites involved in active imaging are specifically designed and dedicated for that purpose. One LEO satellite may cover say 25% of the Earth's surface. Accordingly, four or more satellites are require for complete global coverage. Active type satellites are particularly useful for active imaging applications because of the improvement to image quality over passive systems. The cost of deploying and maintaining multiple satellites dedicated to active imaging is high. There are only a limited number of active imaging satellites presently in operation due, in part, to economic constraints.

A need exist to expand the use of active imaging for terrestrial mapping and object identification.

FIELD OF THE INVENTION

In one embodiment, the present invention is an active imaging system using communication satellites comprising a transmitter emitting a time-synchronized signal directed to a target. A constellation of communication satellites receive and time stamp the time-synchronized signal reflected from the target to form an active image of the target.

In another embodiment, the present invention is an active imaging system using a plurality of satellites comprising a transmitter emitting a signal directed to a target. A plurality of satellites receive the signal reflected from the target with temporal data to form an active image of the target.

In another embodiment, the present invention is a method of active imaging of a target using communication satellites, comprising the steps of emitting a time-synchronized signal from a transmitter directed to a target, and receiving and time stamping the time-synchronized signal reflected from the target through a constellation of communication satellites to form an active image of the target.

In another embodiment, the present invention is an active imaging system using a plurality of satellites comprising a transmitter disposed on a platform and emitting a signal directed to a target. A plurality of satellites receive the signal reflected from the target with temporal data to form an active image of the target with sufficient resolution to identify physical attributes and location of the target.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1:
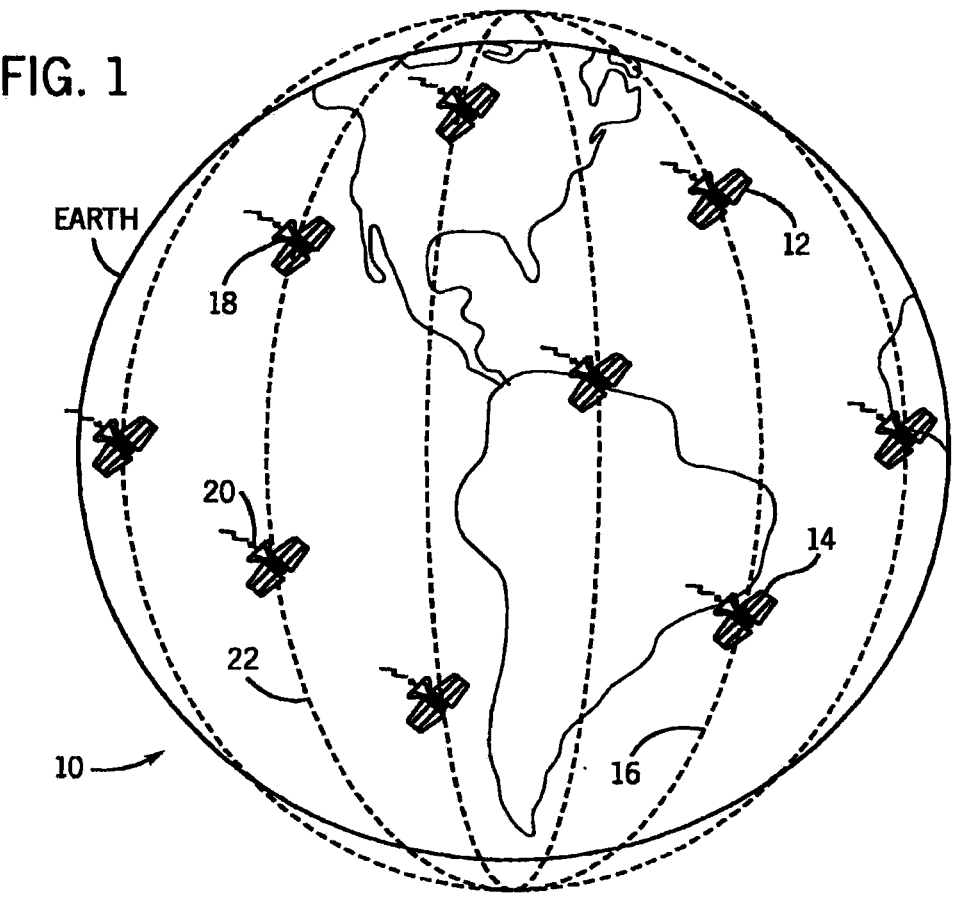
FIG. 1 illustrates a global satellite communication system.

Referring to FIG. 1, a satellite communication system 10 is shown in low Earth orbit (LEO). Satellite communication system 10 includes a constellation of individual satellites, such as satellites 12 and 14 on orbital path 16, and satellites 18 and 20 on orbital path 22. The satellites of communication system 10 follow predetermined orbits that circumscribe the Earth to provide substantially complete coverage over the entire terrestrial surface, e.g., land, oceans, airways, and polar regions. Each satellite has an associated coverage zone from which it can receive transmissions as it passes over the Earth's surface. The coverage zones are controllable and may be isolated, adjacent, or overlapping.

Figure 2:
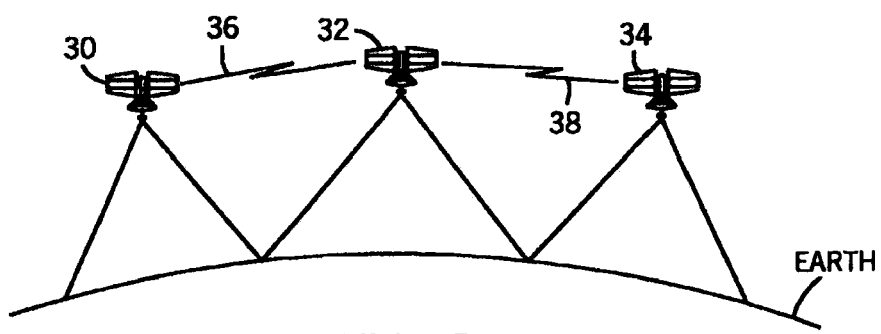
FIG. 2 illustrates a portion of the global satellite communication system in low earth orbit.

FIG. 2 illustrates satellites 30, 32, and 34 in LEO as part of satellite communication system or constellation 10. The antenna arrays of satellites 30-34 are oriented to send and receive voice and data communication from the Earth's surface as well as airborne transceivers in lower earth orbit than satellite constellation 10. Satellites 30-34 are also in direct or indirect communication with one another. RF link 36 connects satellites 30 and 32; RF link 38 connects satellites 32 and 34. Satellite 30 may communicate with satellite 34 by using RF links 36 and 38 and intermediate satellite 32 as a router. RF links 36-38 may be combinations of L-Band frequency channels and may utilize Frequency Division Multiple Access (FDMA) and/or Time Division Multiple Access (TDMA) and/or Code Division Multiple Access (CDMA) communications or combinations thereof. The RF communication links are capable of passing voice and data signals between satellites.

The satellites of constellation 10 have multiple roles. In one mode of operation, the satellites send and receive voice and data communications. A user with a telephone handset can link up to any satellite covering the user's present physical area. The telephone handset communicates via the satellite and ground stations, as discussed below, to a called party.

In another mode of operation, the satellites are used to perform active imaging and object identification. The satellites are capable of monitoring and detecting objects on the Earth's surface as well as airborne structures in lower earth orbit than satellite constellation 10. Any satellite of constellation 10 can receive reflected RF signals from objects below and process the received signals to image and identify the objects. The multi-use of constellation 10 makes active imaging more readily available for users of the system without the cost of dedicating satellites to that specific role.

In one embodiment, satellite communication system 10 is the Iridium™ system presently in operation in geostationary LEO and used for a variety of global wireless communication functions, e.g., digital voice, messaging, and data communications. The global system provides the framework and capability for mobile subscribers in substantially any Earth location to communicate with anyone else, regardless of location, using handheld user terminals. The high bandwidth capacity of the Iridium™ system is ideally suited for industries such as maritime, aviation, government/military, emergency/humanitarian services, mining, forestry, oil and gas, heavy equipment, transportation, utilities, and defense.

The Iridium™ system has three principal components: the satellite network, the ground network, and certain subscriber products including phone handsets and pagers. In its present configuration, the Iridium™ satellite communication system has 66 operational satellites and 11 spares orbiting in a constellation of six polar planes. Each polar plane has 11 mission satellites performing as nodes in the telephony network. The 11 additional satellites orbit as spares ready to replace any unserviceable satellite and thereby ensure that every region on the globe is covered by at least one satellite at all times. The satellites are in a near-polar orbit at an altitude of 485 miles (780 km) and circle the earth once every 100 minutes traveling at a rate of 16,832 miles per hour. Each satellite is cross-linked to four other satellites; two satellites in the same orbital plane and two in an adjacent plane. The cross-linked satellites operate as a fully meshed network.

The ground network has a system control segment and telephony gateways used to connect into the terrestrial telephone system. The system control segment is the central management component for the Iridium™ system and consists of three main components: four telemetry tracking and control sites, the operational support network, and the satellite network operation center. It provides global operational support and control services for the satellite constellation, delivers satellite tracking data to the gateways, and performs the termination control function of messaging services. The primary linkage between the system control segment, the satellites, and the gateways is via K-Band feeder links and cross-links throughout the satellite constellation. Gateways are the terrestrial infrastructure that provides telephony services, messaging, and support to the network operations. The key features of gateways are their support and management of mobile subscribers and the interconnection of the Iridium™ network to the terrestrial phone system. Gateways also provide network management functions for their own network elements and links.

The user terminals may be capable of operating in a full duplex mode and communicate via, for example, L-band RF links (uplink or return link) and S-band RF links (downlink or forward link) through return and forward satellite transponders, respectively. The return L band RF links may operate within a frequency range of 1.61 GHz to 1.625 GHz, a bandwidth of 16.5 MHz, and are modulated with packetized digital voice signals and/or data signals in accordance with any preferred spread spectrum technique. The forward S band RF links may operate within a frequency range of 2.485 GHz to 2.5 GHz, a bandwidth of 16.5 MHz. The forward RF links are also modulated at a gateway with packetized digital voice signals and/or data signals in accordance with the spread spectrum technique.

The 16.5 MHz bandwidth of the forward link is partitioned into 13 channels with up to, by example, 128 users being assigned per channel. The return link may have various bandwidths, and a given user terminal may be assigned a different channel than the channel assigned on the forward link. However, when operating in the diversity reception mode on the return link (receiving from two or more satellites 12), the user is assigned the same forward and return link RF channel for each of the satellites.

The ground segment includes at least one but generally a plurality of the gateways that communicate with satellites 12 and 14 via, by example, a full duplex C-band RF link that operates within a range of frequencies generally above 3.0 GHz and preferably in the C-band. The C-band RF links bi-directionally convey the communication feeder links, and also convey satellite commands to the satellites and telemetry information from the satellites. The forward feeder link may operate in the band of 5.0 GHz to 5.25 GHz, while the return feeder link 19b may operate in the band of 6.875 GHz to 7.075 GHz.

Figure 3:
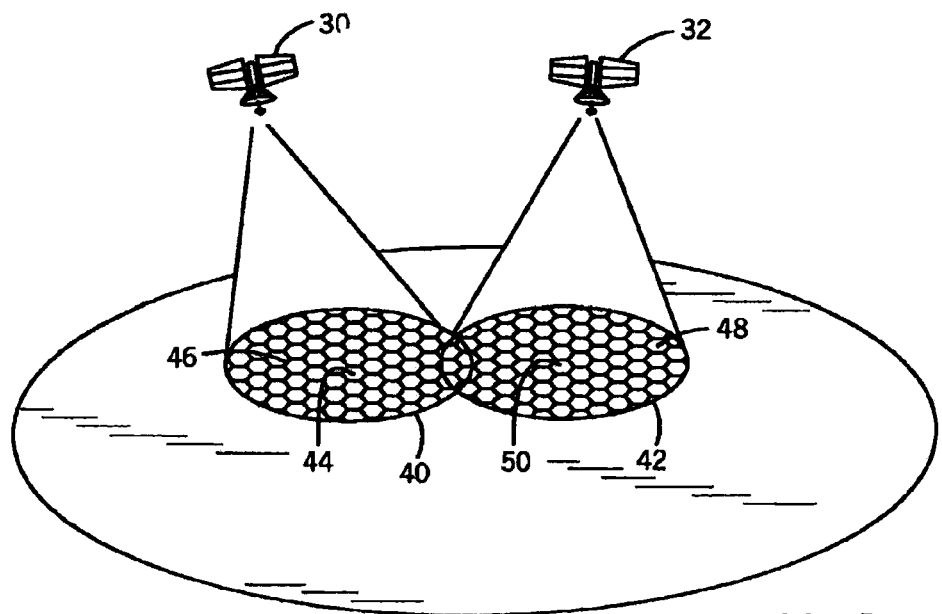
FIG. 3 illustrates two low earth orbit satellites with overlapping cells in their coverage zones.

The satellite feeder link antennas are preferably wide coverage antennas that subtend a maximum earth coverage area as seen from the LEO satellites 12 and 14. In the communication system 10, the angle subtended from a given LEO satellite 12 (assuming 10° elevation angles from the earth's surface) is approximately 110°. This yields a coverage zone that is approximately 3600 miles in diameter. The L-band and S-band antennas are multiple beam antennas that provide coverage within an associated terrestrial service region. As shown in FIG. 3, satellite 30 covers area 40 and satellite 32 covers area 42. The focus of each beam antenna forms a cell within the coverage area. For example, first and second beams from satellite 30 focus on cells 44 and 46 of coverage area 40. Likewise, first and second beams from satellite 32 focus on cells 48 and 50 of coverage area 42. There may be forty cells with a coverage area for a given satellite. The other satellites in constellation 10 have similar coverage areas. The L-band and S-band antennas are adjustable to widen or narrow the size of each cell with the respective coverage area as well as its relative location with the coverage area. The L-band and S-band antennas are also congruent with one another so that the transmit and receive beams from the spacecraft cover the same area on the earth's surface.

The LEO configuration of satellite communication system 10 offers a number of benefits, such as reduced transmission delays and lower transmit power while maintaining complete global coverage. The LEO is characterized by moving patterns of signal "footprints" on the ground, where each footprint corresponds to the coverage area of one or more beams that are transmitted and received by a given satellite as it orbits the Earth. Each antenna pattern or cell is approximately 500-600 miles in diameter and moves across the surface of the Earth at a rate of approximately 110 miles in thirty seconds. The motion of the broadcast channel antenna patterns from the equator to the poles creates overlap of antenna patterns between adjacent satellites. It is often the case that two or more LEO satellites of satellite communication system 10 will have overlapping footprints or coverage areas.

The satellites communicate with terrestrial stations which may be referred to as "gateways". The presence of overlapping coverage areas enables a ground-based receiver to simultaneously receive a communication signal from and transmit a communication signal through a plurality of satellites whose coverage areas overlap. For a receiver that receives multiple copies of the same signal through a plurality of satellites, the effects of multi-path fading and signal blockage can be greatly reduced.

Figure 4:
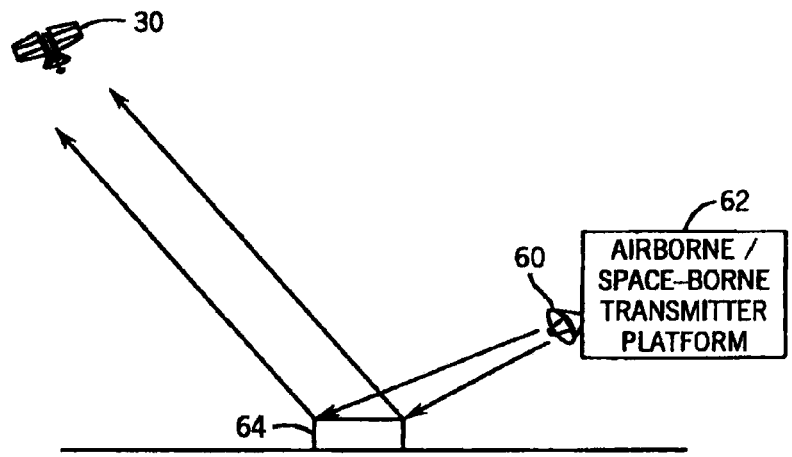
FIG. 4 illustrates an airborne transmitter illuminating an object with radio waves which are reflected to the global satellite communication system.

Turning to FIG. 4, a feature of the present invention is shown as a transmitter or transceiver 60 working in conjunction with the space-based communications system 10. Transmitter 60 radiates an RF signal onto target 64. Transmitter 60 can be an L-band transmitter, phased array, or antenna. In the present embodiment, transmitter 60 resides on an airborne or space-borne platform 62, such as an airplane, satellite, or unmanned aircraft. The satellite may be positioned at a higher or lower orbit than constellation 10. Target 64 can be any stationary or moving object, such as a building, vehicle, natural formation, or manmade structure. Alternatively, target 64 can be just the terrain of the area of interest. The RF signal reflects off target 64 and radiates into the atmosphere. The reflected RF signal will have information content representative of the physical features and attributes of target 64. The reflected signal will contain features of target 64 such as shape, size, hills, valleys, corners, extrusions, indentations, etc. The physical feature content in the reflected RF signal is sufficient in detail to image and identify target 64.

One or more of the satellites in constellation 10 receive the reflected RF signal from target 64. FIG. 4 illustrates target 64 falling within the coverage area of satellite 30. As will be discussed later, since the cells of each satellite are controllable in time and location, target 64 may fall within the individual coverage area of multiple cells of a single satellite or multiple satellites of constellation 10. In other words, the antennas of one or more satellites from constellation 10 can be directed to an area so that the object of interest will readily fall within multiple coverage cells.

Figure 5:
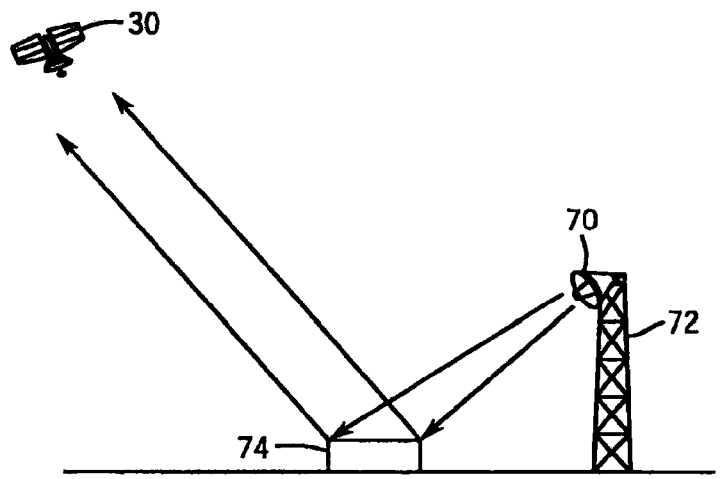
FIG. 5 illustrates a land-based transmitter illuminating an object with radio waves which are reflected to the global satellite communication system.

Alternatively, FIG. 5 illustrates transmitter 70 on a ground-based platform 72. Transmitter 70 radiates an RF signal onto target 64. The RF signal reflects off target 64 and radiates into the atmosphere. Again, the reflected RF signal will contain information content representative of physical features and attributes of target 64 with sufficient detail to image and identify the object. One or more of the satellites in constellation 10 receive the reflected RF signal from target 64. FIG. 5 illustrates target 64 falling within the coverage area of satellite 30.

The reflected signal is received by one or more satellites of communication system 10 and relayed to ground-based computer systems. The goal is to image the ground terrain or object of interest from the reflections of the transmitter signal. The reflected RF signal contains physical features as well as temporal data which allows an image of the terrain or object to be reconstructed by signal processing equipment within the satellite or by the ground-based computer systems. The active image processing can reproduce the object of interest over time and locate and identify the object as well as track movement and changes in its physical nature. Thus, the active imaging system can observe movement of vehicles over the terrain, or even detect fine changes in physical nature, e.g., open trunk of the vehicle.

While one satellite can resolve the reflected active image with some detail, one feature of the present invention is the high resolution available with satellite communication system 10. The high resolution comes from having multiple satellites receiving the same image. The more satellites that receive the reflected RF signal, the more easily the computer can put all those angles together. The more information available to the computer, the higher the quality of the image, with the capability of reaching imaging quality below one wave length. When combined together in time and phase, the reflected signals, as received and processed by the multiple satellites, provide a high resolution active image of the Earth's terrain and objects located thereon. The active imaging system can then perform terrain mapping and object identification.

Consider the following example in which transmitter 60 radiates RF energy onto target 64 (manmade structure) from airborne platform 62 (airplane). The transmitter pans the RF signal across the terrain or focuses the beam on a specific area of interest. When the RF signal strikes the object or terrain of interest, the signal is reflected and radiates into the atmosphere. One or more satellites in constellation 10 oriented to the area of target 64 detects the reflected RF signal, including imaging information contained therein, and processes the RF signal to resolve the image, or forwards the signal to ground-based computer system for processing. Ground processing collects signals from multiple satellite receivers, correlate data, and generate the image. The collection of data leverages the communication system's routing capability to send the data to a desired location. The information content of the reflected RF signal is used to produce a map of the terrain or image of the object of interest.

To gain the temporal data content, the RF signal from transmitter 60 is time-synchronized to the satellites of constellation 10. The RF signal is further time stamped, e.g., by modulating the frequency or encoding time references within the signal. The RF energy reflects off the individual physical features of the manmade structure. The reflected energy is received at least by satellite 30, and possibly by other satellites within constellation 10. Systems like Iridium™ have margins within the receiver cone to allow for multiple satellites to see the same transmitted signal.

By time stamping the received RF signal, satellite 30 is able to determine the time difference between transmission from transmitter 60 and reception by satellite 30. Satellite 30 maintains an accurate clock, time-synchronized to the RF signal from transmitter 60, to decode the time stamp and determine the delta time of the transmission. The transmitter 60 further has reference of its antenna direction and orientation, altitude, longitude and latitude, e.g., by global positioning (GPS). Likewise, satellite 30 has reference of its antenna direction and orientation, altitude, longitude and latitude. From the transmitter and satellite reference information, and delta time of the transmission, the location of target 64 can be determined. The higher the resolution of the reference clock (typically in the microsecond range) and accuracy of the transmitter and satellite reference information, the more accurate the system can ascertain the location of target 64. Also, the more satellites which are able to receive the reflected RF signal from transmitter 60, the more accurate the system can ascertain the physical attributes of target 64.

The active imaging system is capable of identifying physical attributes of target 64 with sufficient resolution as to ascertain its identity or distinguish one target from another target. The reflected RF energy contains details of the terrain or object of interest. The active imaging system identifies physical attributes of the target by resolving structural features. The structural features can be compared to known structures, e.g., by comparison of the target's physical attributes with known structures on file within a database to positively identify the target. For example, if the object of interest is a vehicle, then the active image of the vehicle is compared to files within the database until a high probability of a match is found.

While the transmitter can be designed specifically to accomplish the active imaging mission, the receivers can be designed for other purposes as well. The receivers need to be able to have sufficient resources allocated to the imaging task, as well as be able to time-stamp incoming signals at a frequency sufficient to determine range to target.

Figure 6:
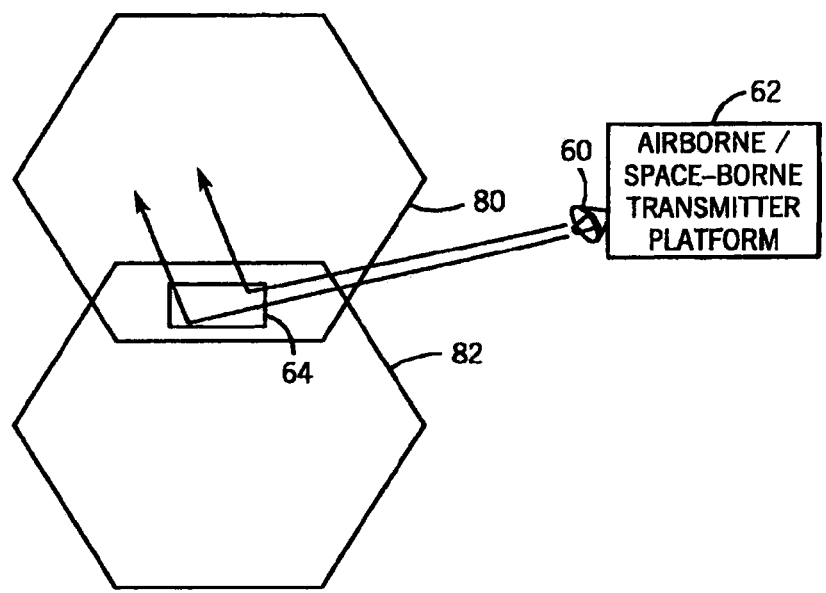
FIG. 6 illustrates two overlapping cells from the same satellite or from different satellites in the constellation.

While some information can be obtained from a single beam focused on target 64, constellation 10 has the ability to focus multiple beams from the same satellite, or from different satellites on the same target. Since the satellite beams are controllable, the constellation can be configured to have overlapping cells, as shown in FIG. 6. Cell 80 overlaps with cell 82 with target 64 in the overlapping area. The overlapping cells can be associated with two beams from a single satellite, or from two beams from different satellites. Having the target within multiple cells increases the resolution of the active image and further refines the target location and identification. This extensive coverage can be leveraged to yield high resolution "stereo" receiving of an active signal for the purpose of imaging ground terrain.

In summary, a principle advantage of the present invention is the use of an existing satellite communication system, or one with multiple purposes to perform the active imaging. In the present embodiment, the Iridium™ system has another role, i.e. data and telecommunications, and has already been designed to give complete global coverage. By using an existing system, the active imaging can be implemented with a transmitter to illuminate the target.

While one or more embodiments of the present invention have been illustrated in detail, the skilled artisan will appreciate that modifications and adaptations to those embodiments may be made without departing from the scope of the present invention as set forth in the following claims.

What is claimed is:

1. An active imaging system using communication satellites, comprising:
   a transmitter emitting an imaging signal directed to a target, wherein the imaging signal includes a first time stamp; and
   a constellation of communication satellites configured to receiving and time stamping the imaging signal reflected from the target to form an active image of the target, wherein:
      the imaging signal is time-synchronized to each satellite in the constellation of communication satellites; and
      each satellite in the constellation of communication satellites has at least one antenna configured to operate in at least one of a first mode for receiving voice and data communications and a second mode for receiving imaging signals reflected from the target; and
      the antenna of a first satellite in the constellation of communication satellites is configured to operate in the first mode while the antenna of a second satellite in the constellation of communication satellites is configured to operate in the second mode.

2. The active imaging system of claim 1, wherein the imaging signal is an L-band RF signal.

3. The active imaging system of claim 1, wherein the transmitter is positioned on an airborne or space-borne platform.

4. The active imaging system of claim 1, wherein the transmitter is positioned on a ground platform.

5. The active imaging system of claim 1, wherein the transmitter is disposed on a satellite in the constellation of communication satellites.

6. The active imaging system of claim 1, wherein the location and identity of the target can be determined by the active imaging system.

7. The active imaging system of claim 1, wherein the imaging signal reflected from the target is received by multiple satellites within the constellation of communication satellites.

8. The active imaging system of claim 1, wherein the imaging signal reflected from the target is received by multiple antenna disposed on one satellite within the constellation of communication satellites.

9. A method of active imaging of a target using communication satellites, comprising:
   emitting an imaging signal from a transmitter directed to a target, wherein the imaging signal includes a first time stamp; and
   receiving and time stamping with a second time stamp the imaging signal reflected from the target through a constellation of communication satellites to form an active image of the target; wherein:
the imaging signal is time-synchronized to each satellite in the constellation of communication satellites; and
each satellite in the constellation of communication satellites has at least one antenna, wherein:
the antenna is configured to operate in at least one of a first mode for receiving voice and data communications and a second mode for receiving imaging signals reflected from the target; and
the antenna of a first satellite in the constellation of communication satellites is configured to operate in the first mode while the antenna of a second satellite in the constellation of communication satellites is configured to operate in the second mode.

10. The method of claim 9, wherein emitting an imaging signal includes emitting an L band RF signal.

11. The method of claim 9, further including positioning the transmitter on an airborne or space-borne platform.

12. The method of claim 9, further including providing multiple roles for the constellation of communication satellites other than active imaging.

13. The method of claim 9, further including locating and identifying the target.

14. The method of claim 9, wherein the imaging signal reflected from the target is received by multiple satellites within the constellation of communication satellites.

15. The method of claim 9, wherein the imaging signal reflected from the target is received by multiple antenna disposed on one satellite within the constellation of communication satellites.

16. The method of claim 9, wherein the transmitter is positioned on a ground platform.

* * * * *